United States Patent [19]
Vincent et al.

[11] Patent Number: 5,588,119
[45] Date of Patent: Dec. 24, 1996

[54] METHOD FOR CORRELATING LOGICAL DEVICE NAMES WITH A HUB PORT IN A LOCAL AREA NETWORK

[76] Inventors: Ronald Vincent, 3803-B2 Rolling Green Ct., Raleigh, N.C. 27604; Marshall Sprague, 5979 Dixon Dr., Raleigh, N.C. 27609; Duncan Hare, 2600 Sherrill Parke Ct., Richardson, Tex. 75082

[21] Appl. No.: 110,507

[22] Filed: Aug. 23, 1993

(Under 37 CFR 1.47)

[51] Int. Cl.$^6$ ..................................... G06F 13/00
[52] U.S. Cl. .............. 395/200.15; 370/403; 340/825.03; 364/242.95; 364/241.8; 364/DIG. 1
[58] Field of Search .............................. 395/800, 200.15, 395/200.16, 200.17, 858, 725, 275, 200; 371/8.2, 11.1, 11.2, 67.1, 68.2; 370/54, 85.1, 85.7, 85.9, 92, 94.1, 94.3, 95.1; 340/825.03, 826, 825.06, 825.07, 825.52

[56] References Cited

U.S. PATENT DOCUMENTS

| | | | |
|---|---|---|---|
| 4,816,826 | 3/1989 | Munter et al. | 340/825.52 |
| 5,179,554 | 1/1993 | Lomicka et al. | 370/85.13 |
| 5,319,644 | 6/1994 | Liang | 370/85.5 |
| 5,394,402 | 2/1995 | Ross | 370/94.1 |
| 5,421,024 | 5/1995 | Faulk, Jr. et al. | 395/800 |

Primary Examiner—Alyssa H. Bowler
Assistant Examiner—Alpesh M. Shah
Attorney, Agent, or Firm—Rhodes, Coats & Bennett, L.L.P.

[57] ABSTRACT

The present invention is a method for automatically correlating the logical name of devices in a local area network with the hub port used for communication by the named resource. Data for correlation is gathered from three sources. First, logical names and node identification for devices connected to the network is obtained from the resource definition file. Secondly, the frames transmitted over the network are monitored at node identification data and adapter addresses is extracted from those frames. Third, hub port identification data and adapter addresses are obtained from intelligent hubs in the network. The data from these sources is then correlated. The resource name is correlated with the adapter address by matching node identification data from the resource definition file with the node identification data captured from the transmitted frames. The hub port identification data is correlated by matching adapter addresses extracted from the captured frames with the adapter addresses obtained from the intelligent hubs. Whenever the physical topology of the hub is changed, the correlation data is automatically updated.

8 Claims, 4 Drawing Sheets

METHOD FOR CORRELATING LOGICAL DEVICE NAMES WITH A HUB PORT IN A LOCAL AREA NETWORK

FIELD OF THE INVENTION

The present invention relates generally to local area networks for interconnecting mainframe computers with personal computers and more particularly to a method of correlating logical device names in such networks with their physical location.

BACKGROUND OF THE INVENTION

In recent years, there has been a trend toward replacing large, mainframe computer systems with networks of personal computers (PCs). Despite this downsizing trend, U.S. businesses have billions of dollars invested in applications running on mainframe computer systems. Replacing these mainframe computer systems is not always cost effective. Further, many engineering and scientific applications still require the computing power of large mainframe systems. Thus, mainframe computer systems are likely to continue to make up a significant segment of the computing industry for years to come.

In a typical mainframe system, people interact with the mainframe computer through terminals. The terminals include screens and keyboards for interacting with the mainframe. Applications running on the mainframe computer may serve multiple terminals simultaneously. Similarly, a single terminal can have multiple sessions running on the mainframe at the same time.

IBM's System Network Architecture (SNA) is a scheme for connecting terminals, printers, and other devices with a mainframe computer. In a typical SNA system, each terminal is connected to a terminal cluster controller through a coaxial cable. The cluster controller acts as a concentrator by gathering messages from multiple terminals for more efficient transmission to the mainframe. Groups of cluster controllers connect via a telecommunications line to a communications controller or front-end processor (FEP). The front-end processor concentrates signals before they are transmitted to the mainframe.

In the SNA connection scheme, each terminal or printer is called a physical unit (PU). Each PU holds one or more logical units (LUs). The logical units address and interact with the mainframe in an SNA system. IBM's Virtual Telecommunications Access Method (VTAM) software, which runs in the mainframe, cooperates with the front-end processor to communicate with the LUs.

Today, large numbers of people have personal computers on their desk top. These desk-top computers are now capable of handling many tasks which were once possible only with mainframe computers and minicomputers. However, many people with desk-top computers also need access to data or programs running on a mainframe computer. It is neither practical nor economical to have both a desk-top computer and a mainframe terminal on each person's desk top.

Terminal emulation products are available which enable a PC or desk-top computer to emulate a mainframe terminal. With these terminal emulation products, PCs can be connected to and share data with mainframe computers. One common method of connecting PCs with mainframe computers is by direct connection of the mainframe to a token ring local area network (TR LAN). In recent years, IBM gave its cluster controllers and front-end processors the capability to become nodes on a token-ring network. Since PCs can also connect directly to a token-ring network, PCs and mainframes can interact on the same network.

A token ring network uses a physical hub topology. In this arrangement, the cables or wires run from a central hub to each station. Each hub connection is referred to as a port. A simple network with less than eight stations may have only a single hub. Larger networks usually have multiple hubs which are connected to one another. One significant advantage of the hub topology is that it isolates the wires connecting each station on the network so that if a failure occurs, the rest of the network can continue to operate. This topology also makes it easy to add, move, and remove PCs and other devices to the network.

The ability to easily reconfigure the physical topology of the network can also be troublesome. When problems occur in a large network, technicians need to correlate the logical address of devices on the network with their physical location in order to isolate the problem. This information is usually in the form of manually created charts, tables or diagrams which must be continuously updated by a network administrator. Since some networks can have as many as 250,000 devices, maintaining such records can be a mammoth undertaking involving hundreds of network administrators.

SUMMARY AND OBJECTS OF THE INVENTION

The present invention is a method for dynamically correlating the logical name of a resource in a local area network with the hub port used for communication by the named resource. The resource names and node identification data for each device connected to the network is obtained from the resource definition files for the network. A computer connected to the token ring monitors each frame transmitted over the network and extracts node identification and adapter addresses from those frames. A program queries the intelligent hubs to obtain adapter addresses and hub port numbers. The information from these sources is then correlated. The resource name is correlated with the adapter address by matching node identification data from the resource definition file with the node identification data captured from the transmitted frames. The hub port number is then correlated by matching adapter addresses extracted from the captured frames with the adapter address from querying each intelligent hub. Whenever the physical topology of the network is changed, the correlation data is automatically updated.

Using the correlation method of the present invention, each network administrator can manage a larger number of resources than previously possible, thus reducing the number of network administrators required for a given size network. Further, the correlation method of the present invention avoids the problem of erroneous data entry into manually created and updated records.

Other objects and advantages of the present invention will become apparent and obvious from a study of the following description and the accompanying drawings which are merely illustrative of such invention.

DETAILED DESCRIPTION OF THE INVENTION

Figure 1:
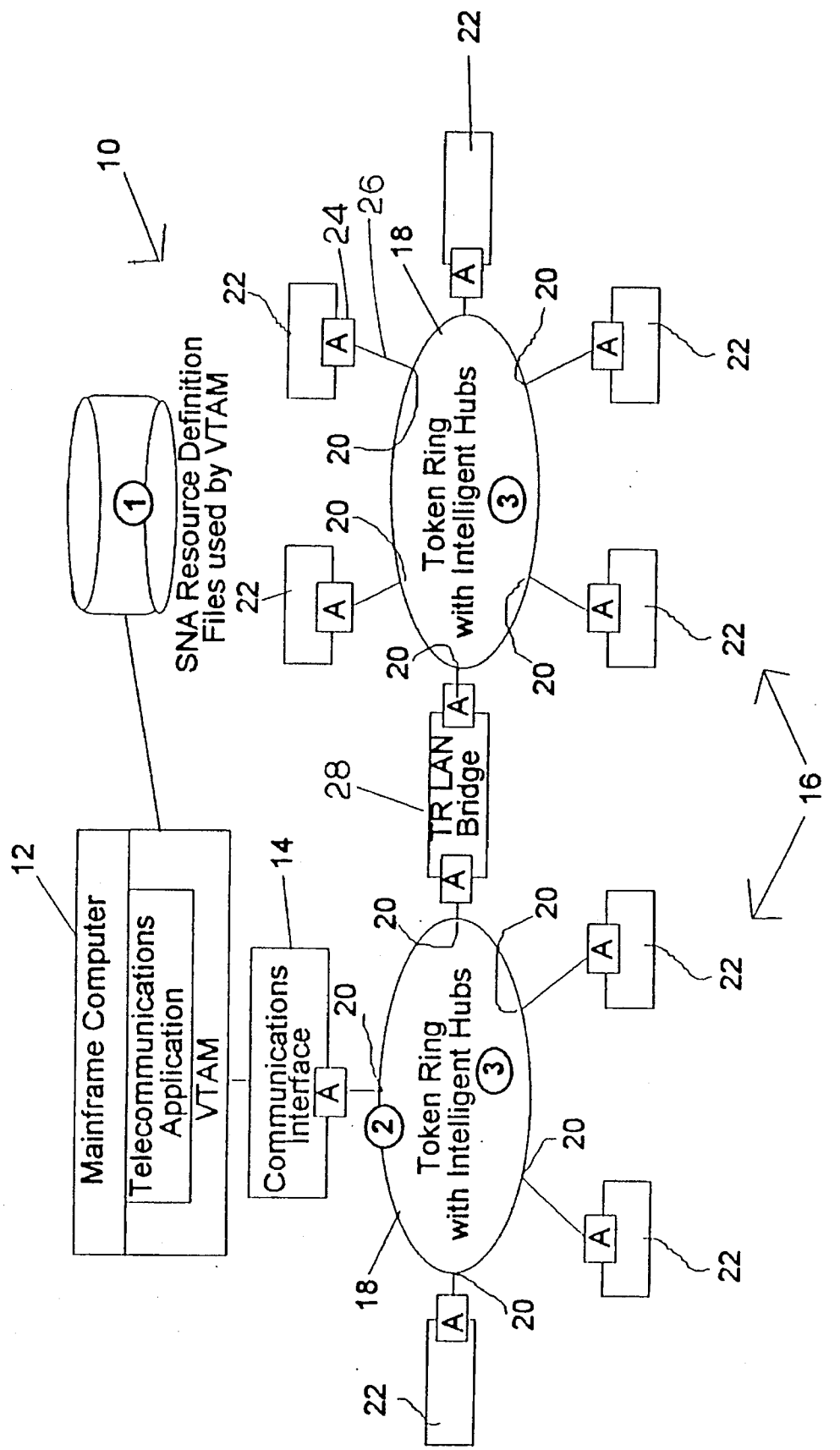
FIG. 1 is a schematic diagram of an SNA network.

Referring now to FIG. 1, an SNA network 10 implementing the correlation method of the present invention is shown. The network 10 includes a mainframe computer 12 which is connected through a communications interface 14 to a token ring local area network 16 (TR LAN). The LAN 16 of the present invention implements IEE 802.5 LAN standards. Although the disclosed embodiment is a token-ring LAN, the correlation method of the present invention may be used with other types of LANs which transmit SNA data.

The TR LAN 16 comprises one or more intelligent hubs 18 which implement simple network management protocol (SNMP). SNMP is a protocol for formatting messages and for transmitting information between devices and data collection programs connected to the LAN 16. Each hub 18 includes a plurality of hub pods 20 for connecting devices 22 such as computers, controllers, and printers to the hub 18. The intelligent hub 18 provides SNMP Management Information Block (MIB) data which uniquely identifies each hub pod. Each device 22 connected to the hub 18 includes a network adapter 24 which is connected by a wire or cable 26 to a respective pod 20 on the hub 18. A bridge 28 joins the two hubs 18 to form a larger network. The bridge 28 is a specialized controller for handling data exchange between two hubs 18.

In an SNA network, each device on the network must be explicitly defined in the Resource Definition File (SYS1.VTAMLST for example) on the mainframe computer. The Resource Definition File includes the logical name and node identification for each device 22 on the network.

Each node or station on the network 10 is also assigned a unique address which is used to identify the source and destination for messages transmitted over the LAN. The node address is used to organize the stations into a logical ring. Each station on the network contains a pointer to the next station. Messages transmitted over the LAN are passed from station-to-station in a sequential fashion. The logical sequence does not necessarily correspond to the sequence of physical connections to the hub.

In a token-ring network, access to the communication media is shared by all of the devices 22 on the network. Only one device 22 at a time is given control over the communications media. A "token" is used to control access to the communications media. The token is a control code which is passed from station-to-station in the network. The station which "possesses" the token has control over the media. The station possessing the token can transmit messages and command other stations to transmit a response. After finishing with its assigned task, the station passes the token onto the next station. Since only one station can possess the token at any given time, the token passing system prevents messages from interfering with one another.

Figure 2:
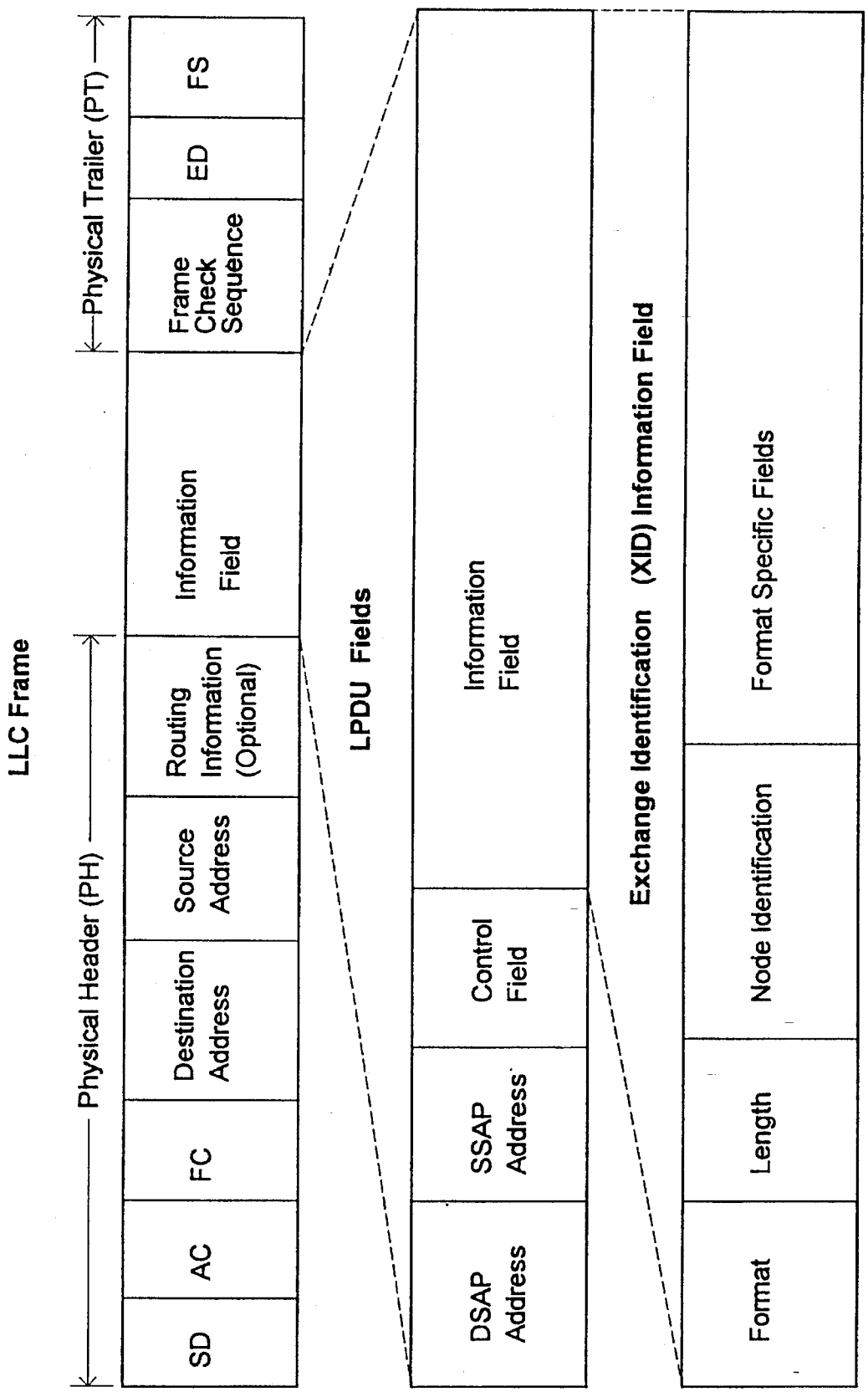
FIG. 2 is a view illustrating a frame used to transmit data on the network.

Data is transmitted in a token-ring network in the form of frames. Frames consist of a plurality of fields which contain the data being transmitted. FIG. 2 shows the contents of a typical frame on a TR LAN16. The frame includes a physical header (PH), an information field (IF) and a physical trailer (PT). Within the physical header (PH) are fields containing the start delimiter (SD), the access control code (AC), frame control code (FC), destination address (DA), source address (SA), and routing information (RI). The destination address field (DA) contains the address of the station which is designated to receive the message. The source address field (SA) contains the address for the station from which the message originated. The routing information field (RI) contains directions for passing the frame on the network.

When a frame is transmitted on the network, the originating station writes its own address in the source address field (SA), and the address of the recipient station in the destination address (DA) field. The frame [circulates around the network and] is monitored by each station. When the destination address field (DA) matches the address of a station on the ring, that station copies the data in the information field (IF). When the frame returns to its originating station, as indicated by the source address field (SA), the frame is removed.

Many types of frames are used in a typical token-ring local area network. For a description of the frames used in a token-ring network, see IBM publication, "Token-Ring Network Architectural Reference" SC30-3374. The present invention utilizes link levels control (LLC) frames.

Referring back to FIG. 2, a link level control frame is identified by a specific control code in the frame control field (FC). For LLC transmissions, the information field is called an LLC Protocal Data Unit (LPDU). The LPDU unit includes a DSAP Address field (DSAP), an SSAP Address field (SSAP), and a Control Field (CF). The DSAP Address field (DSAP) contains the destination service access point. The SSAP Address field (SSAP) contains the source service access point. When the DSAP address field is equal to X"04", the frame contains SNA data and is referred to as an SNA frame. Within the LPDU control field (CF) is an identifier (either AF or BF) that indicates whether the frame contains exchange identification data. An SNA frame having exchange identification data is referred to as an XID frame. An XID frame includes a node identification field which uniquely identifies an SNA station in an SNA network. The node identification field contains either a 12-bit block number (IDBLK) and a 20-bit I.D. number (IDNUM) or a control point name (CP NAME).

Figure 3:
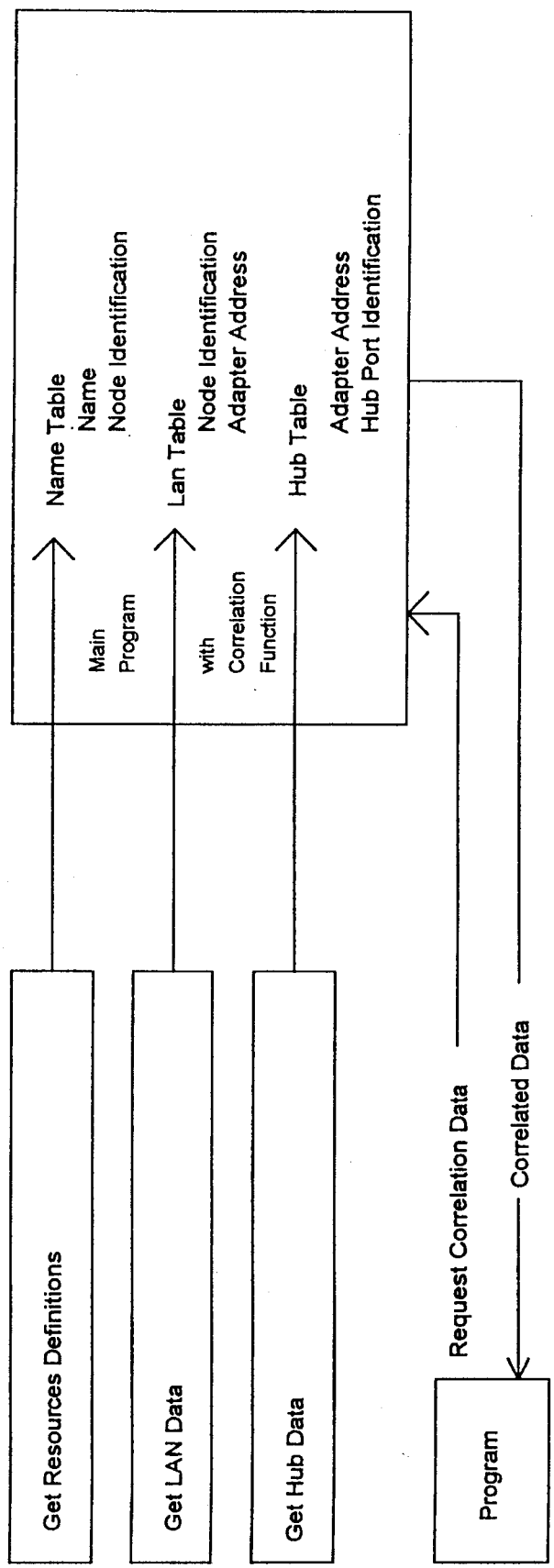
FIG. 3 is a block diagram illustrating the four programs used to implement the correlating method of the present invention.

The correlating method of the present invention uses data obtained from the resource definition file, from XID frames transmitted on the network, and from querying the intelligent hubs in the local area network to correlate logical names of devices with their physical location. FIG. 3 is a schematic-block diagram providing an overview of a correlation process of the present invention.

The process of the present inventions uses four programs, three for gathering data and one for correlating the data. A first program extracts the SNA name and node identification for each device on the network. A second program monitors each frame transmitted over the network and extracts node identification data and adapter address. A third program queries each intelligent hub to obtain the hub-port identification and adapter address for each hub port. This information is shared with the correlation program.

Figure 4:
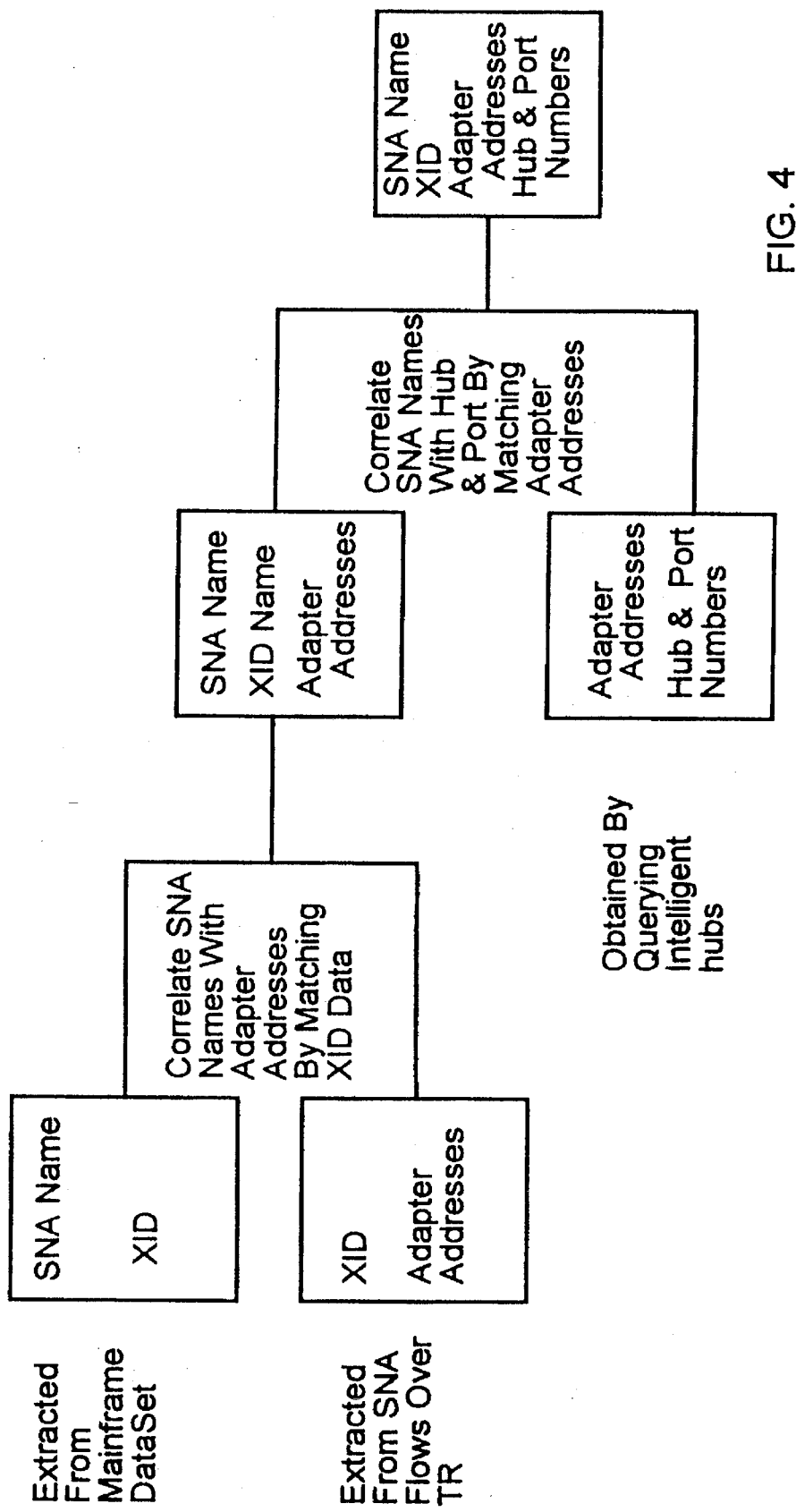
FIG. 4 is a block diagram illustrating the steps and the correlation method of the present invention.

A correlation program communicates with each of the data gathering programs to correlate the data obtained from each of these resources as shown in Table 1 and in FIG. 4.

TABLE 1

| Source | Data Type→ | Name | Node ID | Adapter Address | Hub Port Identification |
|---|---|---|---|---|---|
| 1) SNA Resource Definition Files | | X | X | | |
| 2) SNA Flows on TR LAN | | | X | X | |
| 3) Retrieved from Intelligent Hubs | | | | X | X |

The SNA name for each device is correlated with an adapter address by matching node identification data obtained from the SNA resource definition file and from frames flowing on the network. The hub port identification is then correlated with the SNA name by matching adapter addresses extracted from the frames with those obtained by querying the intelligent hubs. A correlation record is created containing the correlated data for each device on the network.

Appendix A contains a logic description for each program used to implement the correlation method. These programs may comprise a single integrated application running on a single computer on the network. Alternately, each program may be run on separate computers and communicate with one another over the network.

The "Get Resource Definitions Program" normally executes in a computer where the SNA Resource Definition Files can be accessed. For each resource on the LAN 16, it will retrieve the logical (SNA) name of the resource and corresponding node identification. The program will create a name record with information from the VTAM Switched Major Node: PU definition in the SYS1.VTAMLST data set for each LAN switched device defined. The program will respond to requests for name data from the correlation program with all name records created. For a description of VTAM Resource Definitions, see IBM publication SC31-6438 "VTAM Resource Definition Records", Ch. 2, "Definitions Statements for VTAM Nodes", "Switched Major Nodes: PU", pp. 259-271.

When a request for name data is made by the correlation program, the Resource Definition File (RDF) is opened. A name record is created for each device defined. The logical name and node identification for each device is copied from the Resource Definition File to a corresponding name record. The node identification field of the RDF will contain either the IDBLK and IDNUM from the definition file or the CP NAME from the definition file. The Get Resource Definition Program iterates through each resource definition to create a name record for each device defined. The name list is then sent to the correlation program in response to the request.

The Get LAN Data Program executes in a computer where it can copy and examine all SNA frames flowing on the TR LAN. Usually the program is run in a work station attached to the TR LAN.

The first task of the Get LAN Data Program is to open the adapter connected to the computer to copy all frames flowing on the LAN. Each frame is examined to determine whether it is an XID frame. The Get LAN Data Program operates continuously to capture all frames transmitted on the network.

To determine whether a given frame is an XID frame, the frame control field of each frame is examined. If the frame is an LLC frame, then the DSAP Address Field is examined. If the DSAP Address Field contains the hex number X"04" and the Information Field includes an exchange identification field, then a LAN Data Record is created. The data in the Information Field of the current frame is copied to the newly created LAN Data Record. The LAN Data Record includes the node identification, adapter address from the source address field, ring number from the routing information field, and routing information. The LAN Data Record is then sent to the correlation program and cleared.

The Get Hub Data Program executes in a computer where it can retrieve data from each hub. Multiple copies of the Get Hub Data Program running on one or more computers may be used depending on the physical topology of the network. The Get Hub Data Program uses SNMP calls to retrieve management data from the SNMP management information block (MIB) and the adapter address for each intelligent hub port.

Upon entry into the Get Hub Data Program, the program determines whether any hub data exists. If not, the program opens a program initialization file and creates a remote hub table. A remote hub table is created for each intelligent hub 18 including the hub identification and hub communication address. The remote hub table includes a "changed" flag which is set to true. Then, for each port on each intelligent hub 18, the program creates a port ID field and adapter address field. An SNMP command is sent to the intelligent hubs 18 to retrieve the port identification and adapter address. The port identification and port adapter address is stored in the remote hub table. The program iterates through each hub and port and then sets the "check hub" timer.

Each time the check hub timer expires, the program iterates through each hub and port in the remote hub table. For each port in the remote hub table, the program sends an SNMP command to the intelligent hub 18 to retrieve the adapter address for the current port. If the adapter address retrieved does not match the adapter address currently stored in the remote hub table, then the new address is stored in the adapter address field. The "changed" flag is set to true. After iterating through each port, the program checks the "changed" flag. If the "changed" flag is true, then each changed record is sent to the main program and the "changed" flag is reset to false.

The Get Data Hub Program could be replaced by a resident program in the hub which would send a "trap" message to the correlation program each time the address of one of its ports changes. This alternative method would eliminate the need to explicitly query the hub periodically.

The correlation program correlates the logical name for each device on the network with the hub port identification. The hub port identification identifies where the device is physically connected to the network.

The correlation program runs on a computer connected to the network and communicates with the Get Resource Definitions Program, the Get LAN Data Program and the Get Hub Data programs. The program stores the received data in a correlation database with other network management data. The correlation database includes the following tables and fields:

Name Table

Name Field
    Node Identification Field

LAN Data Table

Node Identification Field
    Adapter Address Field
    Ring Number Field
    Routing Information Field Hub Table Adapter Address Field
    Hub Identification Field
    Port Identification Field After initializing communications with the Get LAN Data Program and the Get Hub Data Program, the correlation program remains in a quiescent state until data is sent by one of the data gathering programs, or until it receives a request for correlation data from an application.

When data is received from the Get Resource Definitions Program, the correlation program checks whether a name table exists and contains name records. If the name table does not exist or is empty, a new name record is created for each name record received. The logical name and node identification for each name record received is stored in the corresponding fields of the Name Table. If the name table already exists, then for each name record received the correlation program searches the name table for a record with node identification matching the node identification of the current record received. If no matching record is found in the name table, then a new name table record is created. The logical name and node identification are then stored in the corresponding field of the name table.

When data is sent by the Get LAN Data Program, then for each LAN Record received the correlation program searches the LAN Data Table for a matching record having the same node identification. If a matching record is found, the adapter address, ring number and routing information are copied to the matching record in the LAN Data Table. Any pre-existing data for the matching record is overwritten. If no matching record is found in the LAN Data Table, then a new record is created and the data is copied into the new record.

Similarly, when the data is sent by the Get Hub Data Program, then for each hub record received, the correlation program searches the Hub Table for a matching record with the same hub identification. Any pre-existing data is overwritten. If a matching record is found, the adapter address and port identification is stored in the Hub Table. If no matching record is found, then a new hub record is created in the Hub Table and the data is copied to the new record.

When a user makes a request for correlation data, then a correlation record is created from the information in the Name Table, LAN Data Table, and Hub Table. A request for correlation data may be made by resource name, node identification, or adapter address.

If the request for correlation data is by resource name, then the correlation program finds the logical names specified in the request in the Name Table. The name and node identification from the matching record in the Name Table is copied to the correlation record. Next, the correlation program finds the node identification from the Name Table in the LAN Data Table. The adapter address, ring number, and routing information from the matching LAN Data Table record is copied to the correlation record. Finally, the adapter address from the LAN Data Table is found in the Hub Table. The hub port identification is then copied to the correlation record.

If the request is for correlation by node identification, then the program first finds the node identification specified in the request in the Name Table. The name and node identification from the matching record is copied to the correlation record. Next, the node identification specified in the request is found in the LAN Data Table. The adapter address, ring number, and routing information is copied to the correlation record. Finally, the adapter address from the matching LAN Data Record in the LAN Data Table is found in the Hub Table. The hub pod identification is copied to the correlation record.

If the request for correlation is by adapter address, then the program first finds the specified adapter address in the LAN Data Table. The adapter address, ring number, and routing information are copied to the correlation record. Next, the node identification from the matching LAN Data Record in the LAN Data Table is found in the Name Table. The name and node identification from the matching name record is copied to the correlation record. Finally, the adapter address from the LAN Data Table is found in the Hub Table. The hub pod identification in the matching record is copied to the correlation record.

Once the correlation record is created, it is output to the application in response to request for correlation data.

Each of the programs described cooperate with one another to dynamically create and update a database of information which is used to correlate logical names assigned to the devices in the network with their corresponding hub pods. Thus, the method of the present invention makes it relatively easy to track the physical location of resources on the network and frees up time for the network administrator to perform other tasks. The information collected may also be used in network management applications to perform other tasks.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

APPENDIX

Correlation Program Logic Description

```
DO On Entry
Initialize communications with "Get Flows on TR LAN" program
Initialize communications with "Get Data from Intelligent Hub" program
End DO
DO While Program is Executing
Wait for data from partner program or a Request For Correlation Data
If data received from "Get Resource Definitions" program Then
    If Name Table is empty or does not exist Then
    For number of Name Records received
Create Name Table record
```

APPENDIX-continued

Correlation Program Logic Description

Store received Name in the created Name Table record
Store received Node Identifier in the created Name Table record
    Next Name record
Else
For number of Name Records received
Find the Name Table record with Node Identification = current Name Record
      If Name Table record not found Then
        create a new Name Table record
      Store received Name in the created Name Table record
      End If
      Store received Node Identification in the created Name Table record
Next Name Record
End If
End If
If data received from "Get LAN Data" program Then
  For number of LAN Records received
    Find the LAN Table record with Node Identification in current received LAN
record
    If LAN Table record not found
    Then create a new LAN Table record
    Store received Node Identification in the created LAN Table record
    End If
Store received Adapter Address in the LAN Table record
Store received Ring Number in the LAN Table record
Store received Routing Information in the LAN Table record
Next LAN Record
End If
If data received from "Get Hub Data" program Then
  For number of Hub Records received
    Find the Hub Table record with Hub Identification in current received Hub record
      If record not found
        Then create a new Hub Table record
        Store received Hub Identification in the created Hub Table record
      End If
    Store received Adapter Address in the Hub Table record
    Store received Port Identification in the Hub Table record
Next Hub Record
End If
If Request for Correlation Data is received Then
  Create a Correlation Record
    If the request is for correlation by resource Name Then
      Find the Name specified in the Request in the Name Table
      Store the Name in the Correlation Record
      Store the Node Identification in the Correlation Record
      Find the Node Identification from the Name Table in the LAN Table
      Store the Adapter Address in the Correlation Record
      Store the Ring Number in the Correlation Record
      Store the Routing Information in the Correlation Record
      Find the Adapter Address from the Name Table in the Hub Table
      Store the Hub Port Identification in the Correlation Record
    End If
    If the request is for correlation by Node Identification Then
      Find the Node Identification specified in the Request in the Name Table
      Store the Name in the Correlation Record
      Store the Node Identification in the Correlation Record
      Find the Node Identification specified in the Request in the LAN Table
      Store the Adapter Address in the Correlation Record
      Store the Ring Number in the Correlation Record
      Store the Routing Information in the Correlation Record
      Find the Adapter Address from the Name Table in the Hub Table
      Store the Hub Port Identification in the Correletion Record
    End If
    If the request is for correlation by Adapter Address Then
      Find the Adapter Address specified in the request in the LAN Table
      Store the Adapter Address in the Correlation Record
      Store the Ring Number in the Correlation Record
      Store the Routing Information in the Correlation Record
      Find the Node Identification from the LAN Table in the Name Table
      Store the Name in the Correlation Record
      Store the Node Identification in the Correlation Record
      Find the Adapter Address from the Name Table in the Hub Table
      Store the Hub Port Identification in the Correlation Record
    End If
End If
Send Correlation data record in Response to Request for Correlation Data
Free Correlation Record
  End If APPENDIX-continued Correlation Program Logic Description End DO
End Correlation Program
Get Resource Definitions Program Logic Description
Do on entry
Open data set SYSI.VTAMLST
Create Name List
    For Number of devices on LAN definitions
        Create a Name List record with Name and Node Identification fields
        Store the NAME from the definition in the Name field
            If IDBLK and IDNUM are coded Then
                Store the IDBLK and IDNUM from the definition in Node
                Identification field
            Else
                Store the CPNAME in Node Identification field
            End If
    Next device on LAN definition
    Send the Name List to the Main Program
    Free Name List
End Program
Get LAN Data Program Logic Description
DO On Entry
Open the adapter to copy all frames
End Do
Do While Program is Executing
Examine each frame copied
    If the frame is an LLC frame Then
        If the DSAP = X"04" Then
            If the LLC Information field contains an Exchange Identification
            field Then
                Create a LAN Data record
                Store Node Identification in the LAN Data record
                Store Adapter address from the Source Address in the LAN
                    Data record
                Store Ring number from the routing information field in the
                    LAN Data record
                Store Routing information in the LAN Data record
                Send LAN Data Record to Main Program
                Free the LAN Data record
            End If
        End If
    End If
End DO
End Program
Get Hub Data Program Logic Description
DO On Entry
If Hub Data list does not exist Then
    Open Program Initialization File
    Create Hub list
    For Number of Intelligent Hubs in the Initialization File
        Create Hub table
        Store Hub Identification in Hub list Record
        Store Hub communication address in Hub list Record
        Set "changed" = TRUE in record
        For each port in the Hub
            Create Port ID Field
            Create Adapter Address Field
            Send SNMP command to Get Port Identification
            Store Port Identification in Port ID Field
            Send SNMP command to Get Adapter Address for current Hub Port
            Store Adapter Address in Adapter Address Field
        Next port
        Send Hub Record to Main Program
    Next Hub
End IF
Set Check Hubs Timer
End Do
Do while program is executing
Wait until Check Hubs Timer expires
    For Number of Intelligent Hubs in Hub Table
        For each port in the Hub
            Get Port Identification from Hub list record
            Send SNMP command to Get Adapter Address for current Hub Port
                If Adapter Address Field <> Adapter Address from Hub
                Then
                    Store Adapter Address in Adapter Address Field
                    Set "changed" = TRUE in record
                End If

APPENDIX-continued

Correlation Program Logic Description

```
    Next port
Next Hub
If "changed" = TRUE Then
    Send Hub Record to Main Program
    Set "record changed" FALSE in record
    End IF
End DO
End Program
```

What is claimed is:

1. In a local area SNA network having one or more intelligent hubs, each having a plurality of hub ports, and which transmits SNA data in frames between connected devices, a method for using a computer to correlate SNA logical names for said devices with a particular hub port, comprising:

(a) extracting the SNA logical name and XID number from a resource definition file in which said devices are defined;

(b) extracting XID numbers and corresponding adapter addresses from the frames transmitted on the network;

(c) correlating the adapter addresses from the transmitted frames with the SNA logical device names by comparing the XID number extracted from the resource definition file with the XID number extracted from the transmitted frames;

(d) obtaining hub port identification and its corresponding adapter address from a hub in the network; and (e) correlating the hub port identification with a corresponding SNA logical device name by comparing the adapter address extracted from the transmitted frames with the adapter address obtained from the hub.

2. The correlating method of claim 1 including the step of creating a name table having a logical name field and a node identification field, and storing the logical name and node identification for said devices defined in the resource definition file in the name table.

3. The correlating method of claim 2 further including the step of creating a LAN data table having a node identification field and an adapter address field, and storing the node identification and adapter addresses extracted from the transmitted frames in the LAN data table.

4. The correlating method of claim 3 further including creating a hub table including an adapter address field and a hub port identification field, and storing the adapter addresses and hub port identification data obtained from querying each hub in the hub table.

5. The correlating method of claim 1 wherein the step of extracting node identification and corresponding adapter addresses from frames transmitted on the network includes capturing each frame transmitted on the network; examining the frame to determine whether the frame contains exchange identification data and, if so, extracting the node identification and adapter addresses from the frame; and releasing the frame to be transmitted on the network.

6. The correlating method of claim 1 wherein the step of obtaining hub port identification data and its corresponding adapter address from a hub in a network includes the step of querying the hub at predetermined time intervals.

7. In a local area SNA network having one or more intelligent hubs, each having a plurality of hub ports, and which transmits SNA data in frames between connected devices, a system for correlating SNA logical names assigned to said devices with the hub port to which said devices are connected, comprising:

(a) a resource definition file stored on the network containing the SNA logical names and XID numbers for said devices on the network;

(b) a first program for extracting the SNA logical names and XID numbers for devices from the resource definition file;

(c) a second program for monitoring frames transmitted on the network and extracting XID numbers and corresponding adapter addresses from the transmitted frames;

(d) a third program for obtaining hub port identification data and adapter addresses for hub ports in the network; and (e) a fourth program for receiving data from said first, second, and third programs and for correlating the SNA logical names of connected devices to their corresponding hub ports.

8. A local area SNA network comprising:

(a) a communications media including one or more intelligent hubs, each of which has a plurality of hub ports, said hub including means for obtaining therefrom hub port identification data and adapter addresses assigned to a plurality of connected devices;

(b) said plurality of devices connected by said communication media to respective hub ports, each said device including data transmission and receiving means for communicating with other devices on the network by transmitting and receiving SNA data in frames;

(c) data storage means in a device connected to the network, said data storage means containing a resource definition file having SNA logical names and XID numbers for said devices connected to the network;

(d) processing means in at least one of said devices connected to the network for:

(1) extracting the SNA logical name and XID numbers from the resource definition file;

(2) extracting XID numbers and corresponding adapter addresses from the frames transmitted on the network;

(3) correlating the adapter addresses from the transmitted frames with the SNA logical names by comparing the XID numbers extracted from the resource definition file with the XID numbers extracted from the transmitted frames;

(4) obtaining the hub port identification data and corresponding adapter address from the intelligent hubs; and (5) correlating the hub port identification data with a corresponding SNA logical name by comparing the adapter address extracted from the transmitted frames with the adapter address obtained from the hub.

* * * * *